United States Patent Office 3,706,546
Patented Dec. 19, 1972

3,706,546
METHOD OF CULTIVATING TOBACCO AND AQUEOUS SOLUTION TO BE USED THEREFOR
Shiro Higase, Hatano-shi, Japan, assignor to Ishihara Sangyo Kaisha, Ltd., Nishi-ku, Osaka, and The Japan Monopoly Corp., Minato-ku, Tokyo, Japan
No Drawing. Filed Oct. 16, 1969, Ser. No. 867,093
Claims priority, application Japan, Oct. 16, 1968, 43/74,954
Int. Cl. A01n
U.S. Cl. 71—78                                       11 Claims

ABSTRACT OF THE DISCLOSURE

Method for cultivating tobacco by applying to the flowers and flower buds thereof, as well as the portions of the upper plant to which they are attached, an aqueous composition containing at least one of maleic hydrazide, its alkanolamine salts and its sodium salts and at least one of N-1-naphthylphthalamic acid, its alkali metal salts and its ammonium salt. Such application results in removal of such flowers and flower buds without the disadvantages associated with mechanical topping operations.

BACKGROUND OF THE INVENTION (1) Field of the invention

The present invention relates to a method of cultivating tobacco without mechanical topping by causing flowers and flower buds to fall off by the use of a combined chemical composition and an aqueous solution of said composition to be used therefor.

(2) Description of the prior art

Conventional mechanical topping in tobacco cultivation has previously been carried out with the main object of increasing the yield of leaf tobacco per plant and to enrich the component content of tobacco leaf, and has not come to be regarded as essential in tobacco cultivation. Unless such topping is carried out, various disadvantages result. For example, if the plants are allowed to stand as is without topping, the effective components in the leaves are translocated and consumed due to the growth of the flowers and the fructification action, thereby substantially decreasing the yield of leaf tobacco. Further, properties of aroma and taste are also adversely affected and, in addition, as fructification at the end of the stalk proceeds, the weight of the plant top is increased, resulting in occasional breakage of roots and uprooting of the stalk by wind.

On the other hand, cultivation including the above topping operation is also possessed of certain disadvantages. For example, the ability of the roots to form nicotine is increased by topping. The nicotine so formed transfers to the leaves and thereby the nicotine content in the leaves is increased. At the same time the growth, which is normally decreased by flowering, is renewed by topping to cause thickening of the ripe leaves. Such thickening relates directly to a decrease in filling power and an increase in tar in the manufacture of tobacco products, thus lowering the value of the leaves in the manufacture of tobacco products.

In addition, the topping operation involves the manual labor of topping and removal of the flowers, flower buds, and flower stalk, together with the leaves of the upper stalk, by cutting the main stalk above the leaf axil at a point from the first to the fifth node from the apex by the use of a topping sickle several days after first blossom. This operation must be carried out for each individual tobacco plant and, therefore, the labor required for such topping operation for an area of 10 acres totals to about 8 hours, 2,000 to 5,300 tobacco plants generally being planted in such an area.

Further, since the tobacco plant is occasionally infected with virus disease or Granville wilt disease (*Bacterium selanacrearum* Smith) from the cut end of the topped stalk and heavily damaged, it is necessary to sterilize the cut end with an aqueous solution of mercuric chloride in order to prevent such infection. Such sterilization also requires a great deal of labor. In addition, since the above sterilization is less effective on a day of high humidity, the topping operation is carried out only in fine weather. Therefore, such limitation of topping times results in concentrating the labor load due to overlapping with the tobacco leaf harvest season. Further, due to human toxicity of mercuric chloride, the use of this material has been recently restricted.

In recent years, it has been attempted to cause tobacco flowers to fall off by the application of a chemical agent to the plants. As an agent having such action,

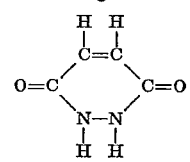

maleic hydrazide, and its salts are known.

However, this agent is effective mainly as applied to flower buds and young flowers having a flower bud of less than about 1.2 cm. in length, at about 10 days before flowering. Such buds fall relatively quickly upon application of the above agents, but they are only very slowly effective for use on adult flowers. Accordingly, when this agent is applied to such adult flowers, the life of the flower is extended and the effects obtained in the case of mechanical topping cannot be achieved. In contrast, if these agents are scattered on flowers, the majority of which are young, the expansion of the top leaves, particularly, is retarded owing to the action of such agents for controlling leaf growth. Further, in this case, the agent has scarcely any effect in lowering the nicotine content of the leaf tobacco. In addition, when using the agent, fallen flowers tend to stick to full-ripe leaves and the flower-deposited portions form a necrotic mottle of about 5 cm.² thereon due to secretions from the fallen flower, or the midrib is broken, and thus the full-ripe leaves are damaged heavily. As a result, this agent is now little used practically.

The present inventor has found that N-1-naphthylphthalamic acid,

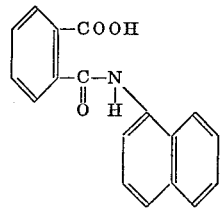

and its salts may be used as a flower thinning agent for tobacco plants without harm thereto. N-1-naphthylphthalamic acid and its salts possess such activity that, in the case of applying it to, for example, a peachblossom, the falling starts 8 to 11 days after application and about 25 days are required for completion of falling. However, in the case of application to a tobacco flower, the agent has such an immediate effect that the fallen ratio (the ratio of the number of fallen flowers and flower buds to that of the total flowers and flower buds) is, for example, about 40% within 2 days after application. Further, the agent acts selectively for adult flowers having flowers and flower buds of more than about 1.2 cm. in length, possessing little activity for young flowers, which grow normally even after application of the agent and bloom and fructify. The agent can be effectively used for the peachblossom since its young flowers which did not fall with the agent fall off thereafter by virtue of physiological causes. However, this agent allows the growth, blooming and fructification of the young flowers of the tobacco plant and therefore is ineffective in overcoming the disadvantages as set forth above relating to the growth of flowers and fructification in such plants. Application of the agent as often as the young flowers of tobacco grow to adult flowers requires several applications until all of the flowers are removed and is, therefore, impractical due to the amount of labor involved.

SUMMARY OF THE INVENTION

As the result of research to overcome the above-mentioned defects of topping operations in tobacco culture, applicant has perceived that the physiological changes of increase in the nicotine content and leaf thickening resulting from such topping is not due to the topping of flowers and flower buds, but is, in fact, caused by the topping of the flower axis and the upper stalk and leaf. Further, he has succeeded in preventing such increase in nicotine and leaf thickening, as well as preventing a decrease in yield, by efficiently removing only the flowers and flower buds by application of a particular chemical agent.

Applicant has perceived that maleic hydrazide or its salts and N-1-naphthylphthalamic acid or its salts possess their respective peculiar phenomenon effects for flowers and flower buds of the tobacco plants as described above and as the result of various experiments in mixing them and applying the mixtures to tobacco plants, applicant has confirmed that the combination possesses a synergistic effect and is excellent for use as a flower thinning agent for tobacco flowers and flower buds so that all the disadvantages as described above are overcome.

It is an object of the present invention to omit the conventional topping operation by causing the flowers and flower buds of tobacco plants to fall off by the application of a solution of combined chemical agents, thereby reducing the labor required in tobacco culture. More specifically, the object of the present invention is to provide a simplified method for cultivating tobacco in comparison with conventional practice. A further object is the provision of an aqueous solution of the combined chemical agents to be used for this method.

That is, the present invention relates to a method for cultivating tobacco, which comprises causing the flowers and flower buds of tobacco plants to fall off by application of an aqueous solution containing a combination of at least one compound selected from the group consisting of maleic hydrazide, its alkanolamine salts and its sodium salt and at least one compound selected from the group consisting of N-1-naphthylphthalamic acid, its alkali metal salts and its ammonium salt to the flowers and flower buds and portions to which they attach in the upper part of tobacco plants (including the peduncle and flower axis).

DETAILED DESCRIPTION OF THE INVENTION

As suitable examples of the alkanolamine salt of maleic hydrazide may be mentioned a monomethanol amine salt, a dimethanolamine salt, a trimethanolamine salt, a monoethanolamine salt, a diethanolamine salt, a triethanolamine salt and the like. Suitable examples of the alkali metal salts of N-1-naphthylphthalamic acid are, for example, its sodium salt, its potassium salt, etc. Mixtures of these compounds may be used. The alkanolamine salts of maleic hydrazide can be obtained, for example, by adding 2 moles of the alkanolamine to 1 mole of maleic hydrazide.

The concentration of maleic hydrazide or its salts in the aqueous solution of this invention may be about 3.0 to 0.05% by weight, preferably about 1.0 to 0.25% by weight. Concentrations in excess of 3.0% are also useful but since little increased effect can be expected as a result of such higher concentrations, they are uneconomical. Further, in some instances as the amount is increased to more than 3.0% by weight, necrotic mottles appear on stalks and upper young leaves. Therefore, higher concentrations are not preferred. On the other hand, concentrations below about 0.05% by weight tend to become ineffective.

The concentration of N-1-naphthylphalamic acid and its salts in the aqueous solution of this invention may be about 0.7 to 0.0025% by weight, preferably about 0.07 to 0.0025% by weight. The effect of employing concentrations above about 0.7% by weight and below about 0.0025% by weight are similar to those stated above for the maleic hydrazide and its salts.

In the aqueous solution of the present invention, if necessary, a surface active agent may be used. As the surface active agent, there may be employed any such agent which will prevent the active materials from being scattered and lost by resins and the like which are secreted from hairs covering the surfaces of the flowers and flower axis of the tobacco plant and which promote the permeation of the active ingredients. Such surface active agents may be either nonionic or ionic (including cationic, anionic and ampho-ionic) surface active agents. In addition, the aqueous composition of this invention may contain other materials conventionally applied to combat diseases and insects appearing at the time of application. For example, fungicides, antibiotics or antagonic microorganisms to combat brown spot (*Alternaria longipes*, wild fire (*Pseudomans tabaci*) and the like, and insecticides to combat tobacco bud worm (*Helicoverpa assulta*), potato tuber moth (*Phthorimae operculella*), green peach aphid (*Mygus persicae*) and the like may be used in combination therewith.

The compositions of the present invention are applied so as to sufficiently cover flowers and flower buds and the portions to which they attach in the upper part of the tobacco plant (including peduncle and flower axis). The compositions of the present invention can be applied during the period from about 10 days before first blossom to the end of blooming to the last flower and are preferably applied from the date of the first blossom to the third or fourth day after this. The amount of the compositions to be used per tobacco plant are about 10 to 200 ml. preferably about 20 to 80 ml. Amounts below 10 ml. may not produce the desired effect sufficiently, and amounts above about 200 ml. are not preferable since, as the amount is increased above this level, necrotic mottles begin to form in the leaves.

The compositions of the present invention are effective regardless of the kinds of tobacco. However, they are particularly valuable in economy of labor in comparison with mechanical topping methods, when applying them to tobacco plants which are tall in height, high in planting density and large in number of leaves per plant. According to the method of the present invention, very immediate effects can be attained. That is, the majority of flowers and flower buds are removed within 1 to 2 days after application and within 7 to 14 days after application they have been removed almost completely.

In addition to the removal of flowers and flower buds, the method of the present invention is effective for sucker control.

Mono-, di-, and triethanolamine salts of maleic hydrazide are especially preferred as components of the compositions of the present invention since they are surface active agents effective to increase the effect of the compositions. Di-methanolamine salts are somewhat poorer in surface active effect. The sodium salt of maleic hydrazide is excellent in removal of flowers and flower buds of tobacco, but is lower in surface active effect in comparison with the foregoing ethanolamine salts and somewhat less durable. When applied to the surface of the tobacco plant, the sodium salt of N-1-naphthylphthalamic acid is saponified by reaction with fatty acids secreted on the surface so that a surface active effect is obtained. The sodium ion does not adversely affect the physiological effect of other ions present since, even after it is absorbed, the sodium ion is not antagonistic to the other ions in cell. Ammonium salts are often absorbed in the tobacco tissue. However, since the ammonium salt, after being absorbed, is used by the plant for synthesis of amino acids and proteins, no ionic antagonism results. Therefore, particularly when used in combination with a surface active agent, the ammonium salt is as effective as the sodium salt.

EXAMPLE 1

5 g. of mixture containing 30% by weight of maleic hydrazide and 70% by weight of the diethanolamine salt of maleic hydrazide, 0.2 g. of sodium N-1-naphthylphthalamate and 1.2 g. of polyoxyethylene sorbitan monolaurate as a surface active agent were dissolved and mixed in 1 liter of water. The aqueous composition was scattered once on tobacco plants (flue-cured tobacco: var. bright yellow) at the time of the first blossom, at the rate of about 40 ml. per plant, by using a sprayer so as to distribute the composition evenly over all of the tobacco flowers and flower buds. Dropping efficiency, economy of labor, yield of leaf tobacco, nicotine content and thickening of leaves were investigated and the results as shown in Table 1 were obtained. For comparison, the above were also investigated on topped tobacco, tobacco on which 5,000 p.p.m. of an aqueous solution of a mixture of 30% by weight of maleic hydrazide and 70% by weight of the diethanolamine salt of maleic hydrazide was applied once, tobacco on which 200 p.p.m. of an aqueous solution of sodium N-1-naphthylphthalamate was applied once, and untreated tobacco. In Table 1, numerical flower value is an average value per plant based on 10 plants selected at random.

weight per 100 cm.$^2$ of samples prepared by cutting four discs from different places in each of the six upper leaves ripened to the harvesting stage and drying the discs at 60° C. so that they contained substantially no water content. This numerical value is recognized to have a positive interrelation with the filling up weight of shred tobacco and the tar content in smoke, the higher value indicating lower value for production of tobacco products.

As is clear from Table 1, in the case of tobacco to which the method of the present invention was applied, 1 to 2 days after application, the flowers and flower buds were mostly fallen off and 13 days after application they were almost completely fallen off. Thus, the compositions of the present invention will be recognized to be immediately effective. Very small flower buds were observed to have fallen off similarly to adult flowers. Considering yield, required labor, nicotine content, and degree of leaf thickening, the tobacco to which the method of the present invention was applied is superior to leaf tobacco treated by the other methods.

In particular, the yield will be recognized to be remarkably increased since the upper leaves which have been abandoned in the conventional mechanical topping method can be utilized.

EXAMPLE 2

Topping tests for tobacco plants (air-cured tobacco: var. Matsukawa, air-cured tobacco: var. Shiroenshu, and burley tobacco: var. Mito No. 3) using various agents were carried out. The mixture (A) of 5 g. of maleic hydrazide and 0.2 g. of ammonium salt of N-1-naphthylphthalamic acid, and the mixture (B) of 2.5 g. of maleic hydrazide and 0.2 g. of ammonium salt of N-1-naphthylphthalamic acid were respectively dissolved in 1 liter of water and 2.0 g. of isooctylphenyl-polyethoxyethanol as a surface active agent were added to each liquid to prepare sample treating compositions. Each of the sample compositions was applied at the rate of 40 ml. per

TABLE 1

| Test method | 2 days after application | | 13 days after application | | 20 days after application | |
|---|---|---|---|---|---|---|
| | X, ea. | Y, percent | X, ea. | Y, percent | X, ea. | Y, percent |
| Topped tobacco | | | | | | |
| Tobacco treated with agent: | | | | | | |
| A | 22.7 | 7.0 | 173.4 | 53.4 | 186.0 | 57.2 |
| B | 101.6 | 26.7 | 131.2 | 34.5 | 160.0 | 42.1 |
| C | 196.8 | 57.5 | 333.9 | 97.6 | 340.0 | 99.4 |
| Untreated tobacco | 0.0 | 0.0 | 13.1 | 6.2 | 29.2 | 13.8 |

Note.—A, Tobacco plants treated with 5,000 p.p.m. of the mixture of maleic hydrazide and its salt; B, Tobacco plant treated with 200 p.p.m. of N-1-naphthylphthalamic salt; C, Tobacco plants treated with the composition of the present invention. X, Number of fallen flowers; Y, Fallen ratio.

| Total number of flowers | Yield per 10 acres (kg.) | | Req. labor per 10 acres (hr.) | | Nicotine content (percent) | | Thickening of leaf (mg./100 cm.$^3$) | |
|---|---|---|---|---|---|---|---|---|
| | a | b | a | b | a | b | a | b |
| | 210 | 100 | 7.60 | 100 | 2.07 | 100 | 880 | 100 |
| 325.0 | 195 | 93 | 2.20 | 28 | 0.76 | 37 | 930 | 106 |
| 380.4 | 208 | 99 | 2.20 | 28 | 1.00 | 48 | 820 | 93 |
| 342.0 | 226 | 108 | 2.20 | 28 | 0.77 | 37 | 798 | 91 |
| 211.4 | 166 | 79 | 0.0 | 0 | 0.63 | 30 | 875 | 99 |

Note.—a, measured value; b, relative value. It will be understood that the second part of the above tabulations should be read as an extension of the first part.

In Table 1, the dropping efficiency was evaluated by investigating the number of flowers and flower buds fallen up to each of the investigation times and the total number of formed flowers and flower buds up to the last time and calculating the fallen ratio from the proportion of the number of fallen flowers and flower buds at each investigation time to the total number of flowers and flower buds. The economy of labor was shown by hours required for operation in each treatment. The nicotine content was given by analyzing leaves containing substantially no water, obtained by drying the harvested leaves in air at 60° C. The thickening of leaves was given by average plant on the upper part of the tobacco plant, particularly flowers and flower buds and the portions where they are attached, by means of a sprayer so as to sufficiently cover them on the day of first blossom for Matsukawa and 2 days after the first blossom for Shiroenshu and Mito No. 3.

Numbers of fallen flowers were investigated on the 14th day for Matsukawa and on the 18th day for Shiroenshu and Mito No. 3 after application, and these numbers of fallen flowers and flower buds were compared with the total numbers of formed flowers and flower buds up to the investigation time to calculate the fallen ratio as shown in Table 2.

In Table 2, the numerical value of flowers is an average value per plant based on 10 plants of tobacco selected at random from among many tobacco plants after the same treatment.

per plant based on 10 plants selected at random from among many tobacco plants having the same treatment.

TABLE 2

| Variety of tobacco | Time of application | Fallen ratio, percent, tobacco treated with agent— | | Untreated tobacco |
|---|---|---|---|---|
| | | A | B | |
| Matsukawa | Date of first blossom | 99.5 | 99.3 | 10.7 |
| Shiroenshu | 2 days after first blossom | 95.6 | 99.1 | 2.8 |
| Mito No. 3 | do | 98.7 | 94.1 | 9.3 |

EXAMPLE 3

Topping tests for tobacco plants (air-cured tobacco: var. Daruma) using a composition of the present invention were also conducted. A mixture of 7.0 g. of dimethanolamine salt of maleic hydrazide and 1 g. of potassium salt of N-1-naphthylphthalamic acid was dissolved in 1 liter of water and 2.0 g. of commercial mixture of ethylenediamine salt of dodecyl-benzene sulfonic acid and polyoxyethylene sorbitan monolaurate as a surface active agent were added thereto to prepare a sample treating composition. The sample composition was scattered at the rate of 40 ml. per plant on the upper part of the tobacco plants, particularly flowers and flower buds and the portions where they are attached, by means of a sprayer so as to sufficiently cover them on the 10th day after the first blossom. On the 15th day after the first blossom, numbers of fallen flowers and flower buds are investigated and were compared with the total numbers of formed flowers and flower buds up to the investigation time to calculate the fallen ratio as shown in Table 3. In Table 3, the numerical value of flowers is an average value per plant based on 10 parts of tobacco selected at random from many tobacco plants with the same treatment.

TABLE 3

Treatment:                       Fallen ratio, percent
    Tobacco treated with agent ------------------ 98.7
    Untreated tobacco ------------------------- 17.6

EXAMPLE 4

Topping tests for tobacco plants (flue-cured tobacco: var. Bright yellow) using compositions of the present invention were conducted. A mixture of 7 g. of the monoethanolamine salt of maleic hydrazide and 0.2 g. of N-1-naphthylphthalamic acid dissolved in 1 liter of water [this solution is referred to as sample liquid (C)] and 1.2 g. of polyoxyethylene sorbitan monolaurate as a surface active agent was added to 1 liter of the (C) solution to prepare sample liquid (D). The sample liquids were scattered at the rate of 40 ml. per plant on the upper part of the tobacco plant, particularly flowers and flower buds and the portions to which they attach, by means of a sprayer so as to sufficiently cover them on the 2nd day after the first blossom. On the 17th day after the first blossom, numbers of fallen flowers and flower buds were investigated and were compared with the total numbers of fallen flowers and flower buds up to the investigation time to calculate the fallen ratio as shown in Table 4. In Table 4, the numerical value of flowers is an average value

TABLE 4

Treatment:                      Fallen ratio, percent
    Tobacco treated with agent (C) ------------ 97.6
    Tobacco treated with agent (D) ------------ 77.5
    Untreated tobacco ----------------------- 17.6

Investigations on nicotine content and thickening of ripe leaves at the leaf harvesting time in the above Example 2 provided the same results as in Example 1, that is employing the method of the present invention, the foregoing desirable effects were found to be obtained.

As is clear from the above explanation and examples, the tobacco cultivation method of the present invention obviates the necessity for conventional mechanical topping and results in a 20% saving in the labor required. Further, remarkable increases in the yield of leaf tobacco are obtained, as well as the production of a leaf tobacco which is low in nicotine content and thickening and which, therefore, has excellent qualities for the production of tobacco products. That is, it is not harsh, hot or penetrating, but light and mild. The method of the present invention also avoids decreases in production caused by disease contracted through the cut ends of topped stalks and renders unnecessary the hazardous use of mercuric chloride, which possesses human toxicity. Further, the growth of suckers can be prevented. In addition, the method of the present invention has the effect of increasing the filling power of shred tobacco, increasing the yield of leaf tobacco in comparison with the prior art method such as the application of maleic hydrazide or its salts only and is further free from such disadvantages of damage to ripe leaves by secretions from the fallen flowers as experienced in the latter method.

What is claimed is:

1. A method of cultivating tobacco comprising causing flowers and flower buds of tobacco plants to fall off by applying to such flowers and flower buds and the locus of attachment thereof, an aqueous composition containing at least one compound selected from the group consisting of maleic hydrazide, its alkanolamine salts and its sodium salt and at least one compound selected from the group consisting of N-1-naphthylphthalamic acid, its alkali metal salts and its ammonium salt in an amount effective to cause the removal of said flowers and flower buds.

2. The method of claim 1, in which the aqueous composition contains 3.0 to 0.05% by weight of at least one compound selected from the group consisting of maleic hydrazide, its alkanolamide salts, and its sodium salt and 0.7 to 0.0025% by weight of at least one compound selected from the group consisting of N-1-naphthylphthalamic acid, its alkali metal salts and its ammonium salt.

3. The method of claim 1 in which the aqueous solution is applied at the rate of 10 to 200 ml. per tobacco plant.

4. The method of claim 1 in which the alkanolamine salt of maleic hydrazide is the diethanolamine salt.

5. The method of claim 1 in which the alkali metal salt of N-1-naphthylphthalamic acid is the sodium salt.

6. The method of claim 1 in which the aqueous solution is applied during the period from the day of the first blossom to the fourth day thereafter.

7. The method of claim 1 in which said aqueous composition contains, in addition, an effective amount of a surface active agent.

8. The method of claim 3, wherein said aqueous solution is applied at a rate of from 20 to 80 ml. per tobacco plant.

9. The method of claim 2, wherein said N-1-naphthylphthalamic acid, its alkali metal salts, or its ammonium salt is employed in a concentration of from 0.07 to 0.0025%, by weight.

10. The method of claim 2, wherein said maleic hydrazide, its alkanolamine salts, or its sodium salt is present in an amount of from 1.0 to 0.25%, by weight.

11. A method of cultivating tobacco comprising causing flowers and flower buds of tobacco plants to fall off by applying to such flowers and flower buds and the locus of attachment thereof, an aqueous composition containing at least one compound selected from the group consisting of maleic hydrazide, its alkanolamine salts and its sodium salt and at least one compound selected from the group consisting of N-1-naphthylphthalamic acid, its alkali metal salts and its ammonium salt in an amount effective to cause the removal of said flowers and flower buds, said maleic hydrazide, its alkanolamine salts, or its sodium salt being present in an amount of from 3.0 to 0.05%, by weight, and said N-1-naphthylphthalamic acid, its alkali metal salts, or its ammonium salt being present in an amount of from 0.7 to 0.0025%, by weight.

References Cited

UNITED STATES PATENTS

| | | | |
|---|---|---|---|
| 2,556,665 | 6/1951 | Smith et al. | 71—115 |
| 3,556,763 | 1/1971 | Gower et al. | 71—78 |

JAMES O. THOMAS, JR., Primary Examiner

U.S. Cl. X.R.

71—92, 115